(12) United States Patent
Leymann et al.

(10) Patent No.: US 6,826,560 B1
(45) Date of Patent: Nov. 30, 2004

(54) SUBSCRIPTION AND NOTIFICATION WITH DATABASE TECHNOLOGY

(75) Inventors: Frank Leymann, Aidlingen (DE); Dieter Roller, Schoenaich (DE)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 09/608,737

(22) Filed: Jun. 30, 2000

(30) Foreign Application Priority Data

Jul. 6, 1999 (EP) .......................................... 99113020

(51) Int. Cl.⁷ .......................... G06F 17/30; G06F 7/10
(52) U.S. Cl. ....................................................... 707/3
(58) Field of Search ............................................ 707/3

(56) References Cited

U.S. PATENT DOCUMENTS

| | | | | |
|---|---|---|---|---|
| 5,497,317 A | * | 3/1996 | Hawkins et al. | 364/408 |
| 5,797,002 A | * | 8/1998 | Patterson, Jr. et al. | 395/611 |
| 5,809,483 A | * | 9/1998 | Broka et al. | 705/37 |
| 5,903,882 A | * | 5/1999 | Asay et al. | 705/44 |
| 6,256,676 B1 | * | 7/2001 | Taylor et al. | 709/246 |
| 6,338,055 B1 | * | 1/2002 | Hagmann et al. | 707/2 |
| 6,347,307 B1 | * | 2/2002 | Sandhu et al. | 705/35 |
| 6,405,191 B1 | * | 6/2002 | Bhatt et al. | 707/3 |

FOREIGN PATENT DOCUMENTS

JP 10011373 1/1998

OTHER PUBLICATIONS

*Message Brokers: A Focused Approach to Application Integration, Part 1*, R. Schulte, Strategic Analysis Report, Gartner Group, 1996.

* cited by examiner

*Primary Examiner*—Wayne Amsbury
*Assistant Examiner*—Cindy Nguyen
(74) *Attorney, Agent, or Firm*—Sawyer Law Group LLP (57) ABSTRACT

The present invention teaches in general how to efficiently exploit active database technology and extensible database technology, i.e. triggers and user-defined functions for processing subscriptions. According to a first aspect of the present invention it is proposed to aggregate all subscriptions on a certain table, or more generally of a plurality of tables, into a single trigger on this table or tables, respectively. This will dramatically improve the trigger-based efficiency. According to a second aspect of the present invention it is proposed to deliver the information a subscriber has registered for directly out of the database systems address space via appropriate user defined functions which is another source of efficiency improvement.

24 Claims, 6 Drawing Sheets

Modifications

Stock

| Name | Price | Amount |
|---|---|---|
|  |  |  |

Stock-EQ

| Subscriber | Name | Price | Amount | AND_ID |
|---|---|---|---|---|
|  |  |  |  |  |

Stock-NE

| Subscriber | Name | Price | Amount | AND_ID |
|---|---|---|---|---|
|  |  |  |  |  |

Stock-GT

| Subscriber | Name | Price | Amount | AND_ID |
|---|---|---|---|---|
|  |  |  |  |  |

Stock-LT

| Subscriber | Name | Price | Amount | AND_ID |
|---|---|---|---|---|
|  |  |  |  |  |

Frank:
Name = 'IBM'

Peter:
Name = 'IBM' AND
Price > 200

Don:
Name = 'IBM' AND
Price > 190 AND
Amount > 100

Janet:
( Name = 'IBM' AND
  Price > 200 ) OR
( Name = 'SAP' AND
  Price > 1000 AND
  Amount > 500 )

Stock-EQ

| Subscriber | Name | Price | Amount | AND_ID |
|---|---|---|---|---|
| Frank | IBM | NULL | NULL | 1 |
| Peter | IBM | NULL | NULL | 1 |
| Don | IBM | NULL | NULL | 1 |
| Janet | IBM | NULL | NULL | 1 |
| Janet | SAP | NULL | NULL | 2 |
| | | | | |

Stock-GT

| Subscriber | Name | Price | Amount | AND_ID |
|---|---|---|---|---|
| Frank | NULL | NULL | NULL | 1 |
| Peter | NULL | 200 | NULL | 1 |
| Don | NULL | 190 | 100 | 1 |
| Janet | NULL | 200 | NULL | 1 |
| Janet | NULL | 1000 | 500 | 2 |
| | | | | |

FIG. 6

```
CREATE TRIGGER stock_subs
AFTER INSERT ON stock
REFERENCING NEW AS n
FOR EACH ROW MODE DB2SQL
SELECT DISTINCT
      deliver(subscriber, n.NAME, n.PRICE, n.AMOUNT)
FROM STOCK_EQ EQ, STOCK_GT GT
WHERE (EQ.NAME = n.NAME OR EQ.NAME IS NULL)
AND (EQ.PRICE = n.PRICE OR EQ.PRICE IS NULL)
AND (EQ.AMOUNT = n.AMOUNT OR EQ.AMOUNT IS NULL)
AND EQ.SUBSCRIBER = GT.SUBSCRIBER
AND EQ.ANDID = GT.ANDID
AND (GT.NAME < n.NAME OR GT.NAME IS NULL)
AND (GT.PRICE < n.PRICE OR GT.PRICE IS NULL)
AND (GT.AMOUNT < n.AMOUNT OR GT.AMOUNT IS NULL)
```

SUBSCRIPTION AND NOTIFICATION WITH DATABASE TECHNOLOGY

CROSS REFERENCE TO RELATED APPLICATIONS

Applicants claim the foreign priority benefits under 35 U.S.C. § 119 of European Patent Application No. 99113020.4, filed in the European Patent Office on Jul. 7, 1999. The European application is incorporated by reference into this application.

FIELD OF THE INVENTION

The present invention is from the area of notification systems and message brokering. In particular, the present invention relates to the area of processing notifications and in particular of publish and subscribe requests.

BACKGROUND OF THE INVENTION

The present invention has a very general scope. Its basic principles can be applied in any situation in which any notification process or brokering, and in particular publish and subscribe processes take place.

The present invention introduces database technology into these matters of interest. It should be understood that for the sake of this invention the data model of the database system is irrelevant. Also, the database system might manage persistent data on disk or might manage data in main memory, i.e. a main memory database. Nevertheless, the terminology of relational database systems is persistently used in here for simplicity and increased clarity.

In general, a message broker is an instrument which is applied in a situation where messages are often and sometimes periodically sent from a plurality of message sources m to a plurality of message sinks n in a m/n relationship. Special cases of 1:m and n:1 occur as well. Message brokers 'share' messages in a way that a source—often being any kind of program application—needs to transmit only one message and the broker delivers one or many versions of it to one or more sinks which are often applications as well. Further details on message broker systems can be found in R. Schulte, Message Brokers: A focused approach to application integration, Gartner Group, Strategic Analysis Report SSA R-401-102, 1996.

More particularly, a message broker is like a hub where messages are streaming in and are streaming out. The messages which are streaming into the broker are referred to hereinafter as being published. Messages which are streaming out of the broker are referred to as being subscribed. A subscription request specifies the subset of all incoming messages a particular application is interested in, and the format in which it has to be presented to the subscriber.

For example, various stock exchanges might publish stock data periodically, i.e. the stock data is sent to the message broker. Each stock exchange might use a different format to transfer its data. A subscriber might have registered to all messages about IBM stock data exceeding $103 and might request its delivery in XML format.

In state-of-the-art message brokers that provide publish/subscribe functionality significant effort is spent in managing the published messages and the subscriptions. This management is typically performed by using its own mechanisms. The present invention proposes to use object-relational database technology to implement publish/subscribe functionality.

State-of-the-art message brokers typically deal with messages that are being published and that subscribers would like to know about. However, subscribers are not just interested in messages that are being published, but also in changes that are applied to data stored in one or more tables in one or more databases. The present invention implements this functionality based on object-relational database technology.

Thus, it would be desirable to alleviate this big amount of programming, customizing effort. The above-cited prior art reference analyzes the feasibility of database technology used as a base for message brokering. It concludes that database systems lack many features that are necessary for message brokering, e.g., the middleware designed for performing the brokering, such as interface engines and message switches. Thus, a database technology as a base for message brokering is rejected in the above cited reference as being too difficult and complex to realize, and too slow in performance.

When analyzing the behavior of publish/subscribe technology using a database oriented view, the following observation can be made: a subscription request is similar to a query. Based on what has been specified in the subscription request, messages are filtered out and are delivered to its recipient. But there is a fundamental operational difference between a query and a subscription: A subscription does not operate on all messages stored for example in a message warehouse but only on a single message at a time, namely the message that has just been published to the message broker. Furthermore, typically many subscriptions will be registered with a message broker, i.e. identifying subscriptions with queries will result in the situation in which many queries will have to be evaluated on a single message: This situation reverses the situation typically found in query systems where the number of data items to be inspected exceeds the number of queries by many orders of magnitudes.

The proposal of the present invention to use object-relational database technology for publish/subscribe technology faces two problem areas that must be solved:

Firstly, how to efficiently identify operational data that is relevant to be published and secondly, how to perform subscriptions efficiently based on externalized database technology.

Figure 1:
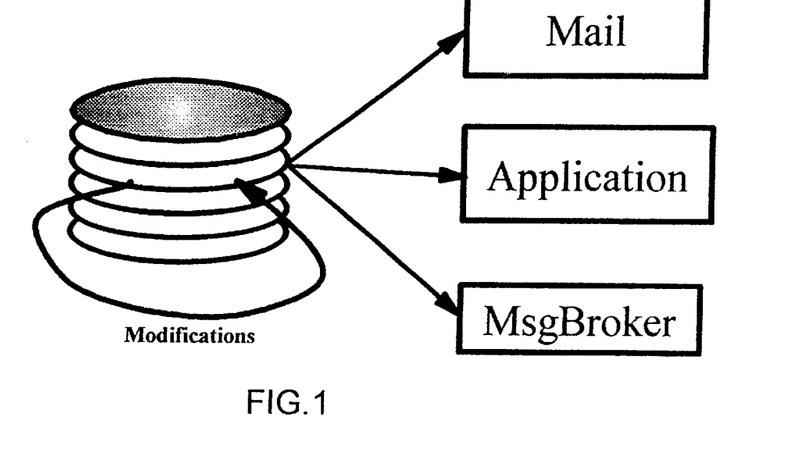
FIG. 1 is a schematic representation of a database in the role of a publisher according to the present invention.

The first problem area results from the fact that most message brokers are not implemented based on database technology, and that in business environments having a natural need for management relevant enterprise data particular modifications of e.g., operational data are often seen as events that are relevant for external applications. This is depicted in FIG. 1.

For example, if a new tuple is inserted into a table, a person might want to be informed about this fact via a corresponding e-mail, or an application must be invoked because of this, or a message broker in turn has subscribers that want to get this data. Thus, the database may be seen as a source for publications.

In particular, when a message broker is used to manage the subscription requests for the changes in operational data and thus the operational data changes need to be published to the message broker, the importance of pre-filtering of publications becomes obvious. If each of the huge number of changes of operational data is pushed to the message broker which then determines whether or not a subscriber for the subject change exists, lots of data may be processed unnecessarily. This might be a waste of resources. Thus, providing subscription functionality within a database system is beneficial, in general.

Otherwise, without having subscription features natively provided within the database system the modified data has to be transformed into a message, then has to be sent, i.e. published to a separate message broker, and this message broker has to determine all corresponding subscribers. In this approach the database would be considered to be a publisher only, the message broker's subscription engine is used to determine whether or not any subscriber is interested in the modified data.

If no subscriber is interested in this data communication between the database system and the message broker including associated data transformations etc. then much work and traffic is performed in vain putting unnecessary load onto the overall environment. Furthermore, a usage of a separate subscription engine would ignore the fact, that the database system's query capability can be immediately used to process the subscriptions directly without needing a separate message broker engine—this will further improve efficiency.

The second problem deals with efficiency of implementing subscriptions based on database technology itself. Nearly all relational database systems are supporting trigger mechanisms today. Triggers allow the database system to automatically perform an action based on a registered interest on relevant modifications of data. There seems to be a suggestion for recognizing a 'natural' fit between triggers and subscriptions. Simply map each subscription request onto a corresponding trigger.

Figure 2:
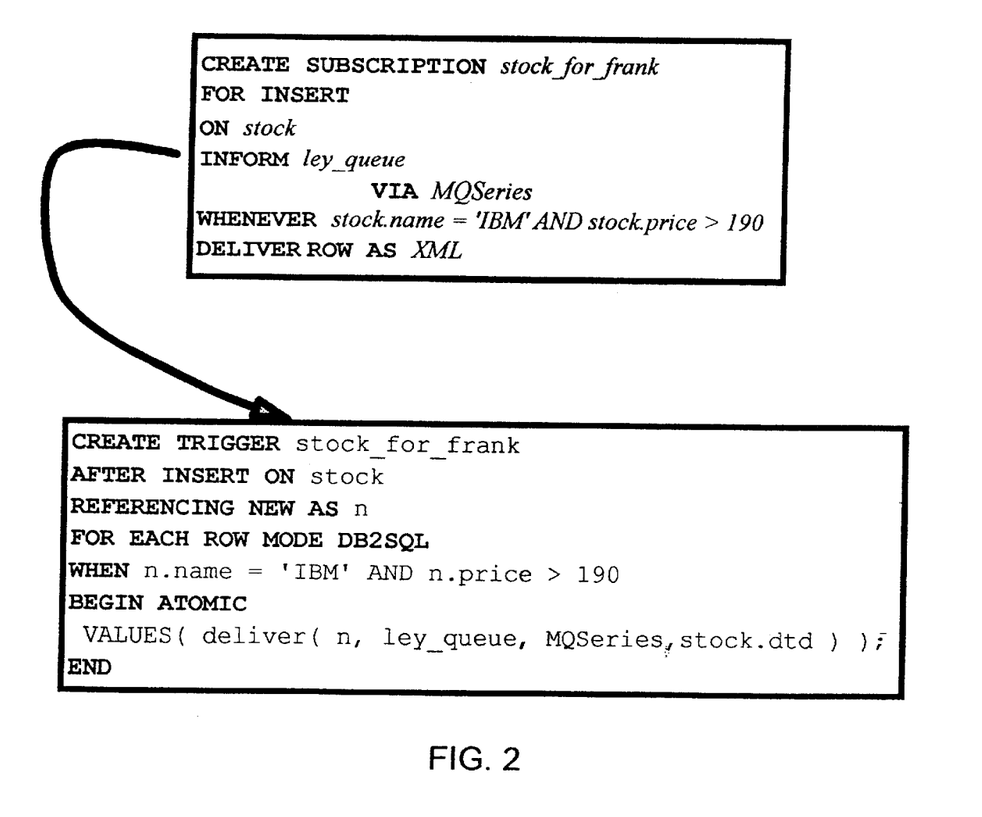
FIG. 2 is a schematic SQL code excerpt showing the mapping of subscriptions to triggers according to the present invention.

For example, assuming that a STOCK table contains rows reporting the NAME of a company, its actual stock PRICE, and the AMOUNT traded. Then, each subscription on modified stock data is mapped to a separate trigger in this table. Please refer to FIG. 2 for a sample mapping of a particular subscription. If a number of S(T) subscribers, with T as an abbreviation for 'table', have registered for modifications on a given table T, and a number of n(T) modifications happen per second on this table, then S(T)×n(T) triggers have to be run per second for table T. In practice, this number is even larger because more than one table will be of interest for subscriptions. If there are 10 modifications on the stock table per second and 100 subscriptions, both moderate estimates, 1,000 triggers have to be run on this single table. This is out of the scope of current database technology.

Therefore, the object of the present invention is to provide a method and system for efficient usage of database technology for notifications, and in particular for subscriptions.

SUMMARY OF THE INVENTION

These objects of the invention are achieved by the features stated in enclosed independent claims. Further advantageous arrangements and embodiments of the invention are set forth in the respective subclaims.

The present invention teaches in general how to efficiently exploit active database technology and extensible database technology, i.e. triggers and user-defined functions, for processing subscriptions.

According to a first aspect of the present invention it is proposed to aggregate all subscriptions on a certain table, or more generally of a plurality of tables, into a single trigger on this table or tables, respectively. This will dramatically improve the trigger-based efficiency.

According to a second aspect of the present invention it is proposed to deliver the information a subscriber has registered for, by exploiting the database system provided facility of user-defined functions. This allows the creation of the information to be sent to the subscriber(s) from the address space the database system is running, which is another source of efficiency improvement.

Figure 3:
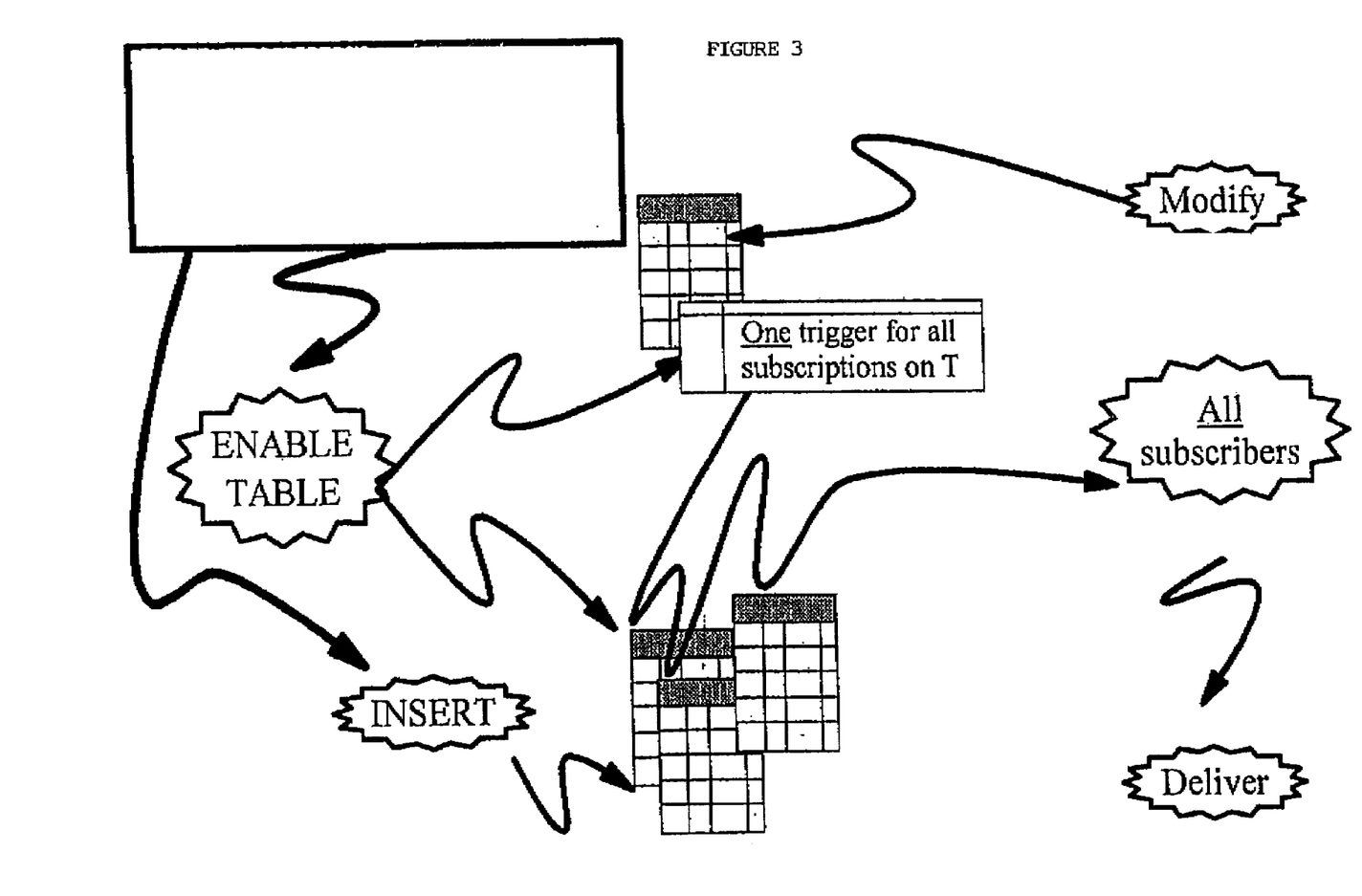
FIG. 3 is a schematic sketch illustrating the setting up of and use of a single subscription trigger per table according to the present invention.

The overall processing can thus be summarized as follows:

When a first subscription is registered for a table T this kind of "aggregated subscription trigger" is created on the table T, and a collection of so-called metadata tables suitable to hold all subscriptions for the table T is created which is called ENABLE TABLE, depicted in FIG. 3. It should be noted that this function can also be realized as a separate utility explicitly to be invoked by an administrator, for example.

Preferred embodiments for creating suitable metadata tables and for creating aggregated subscription triggers are described later in more detail.

Each single subscription is reflected by "simply" INSERTing appropriate tuples into these latter metadata tables, i.e. according to the invention no separate trigger is created and no modification on the single subscription trigger has to be applied.

A preferred embodiment for reflecting a subscription as tuples in the associated metadata tables is described in detail.

When a tuple is manipulated in table T which corresponds to a publication in a usual prior art message broker the corresponding trigger fires and determines in a single invocation all subscribers interested in modification of tuples.

Using a single subscription trigger to achieve the desired efficient usage of the database system's trigger features has its price in that. The query in the body of the trigger must be a more complicated one as it basically has to search for all potential subscribers in the associated collected metadata tables. Depending on the embodiment of the present invention this might involve at least an n-way join where n is the number of comparison operators supported in subscription filters for the target table. Nevertheless, query systems have been optimized for decades to perform n-way joins very efficiently.

With reference to the notification which is initiated by the database trigger it should be mentioned that the inventional concept is very general in this respect. Notification could mean, for example, that a message in the sense of a messaging system is sent, an action is performed on an object managed on an object server, or, an e-mail is sent to the subscriber. It could be even inserted into a table that is maintained for each subscriber, which allows the subscriber to retrieve the appropriate notifications by querying the table.

With respect to the second aspect of the present invention as mentioned above the actual construction of the notification to be sent to each qualified subscriber can be done based on a so-called user-defined function (UDF). While the filter of the query in the body of the trigger determines the qualifying subscribers, the SELECT-clause of the query may reference a UDF which initiates the delivery of the notification to each subscriber. This delivery UDF is automatically invoked by the database system for each qualified subscriber. The delivery function will get all data necessary, e.g., the relevant values of the modified tuple which caused the firing of the trigger, the recipients address, etc., to construct the notification. Based on this data passed, the delivery function will construct the notification and send it to the recipient's address, e.g. via a message queuing system like MQSeries, via e-mail etc. A preferred embodiment of the delivery UDF is described in more detail later.

As an advantage, the present invention builds an efficient subscription mechanism on top of existing database functionality. No modifications to the database system are required. Thus, a standard object-relational database system can be utilized, as it is, to implement a publish/subscribe engine. Furthermore, the subscription mechanism described easily transforms a database into a publisher of messages.

BRIEF DESCRIPTION OF THE DRAWINGS

The present invention is illustrated by way of example and is not limited by the shape of the figures of the accompanying drawings in which.

DETAILED DESCRIPTION

Before discussing the elements of a preferred embodiment of the present invention it should be noted that it can be assumed that a subscription filter P is specified in disjunct normal form; this is no loss of generality since it is well known that each filter can be transformed into this form and how this is done.

Thus, the subscription filter P can be written as $P=B_1 \vee \ldots \vee B_k$ where each $B_j$ is of the format $B_j=(A_{j1}\sim_{j1}v_{j1}\wedge \ldots \wedge A_{jn_j}\sim_{jn_j}v_{jn_j})$.

In such an expression, $A_{ji}$ is an attribute of the table the subscription is for, $\sim_{ij}$ is a comparison operator (e.g. $>$, $\geq$, $<$, $\leq$, $=$, $\neq$, LIKE, ...) applicable to the domain of $A_{ji}$, and $v_{ji}$ is a value from the domain of $A_{ji}$. In summary, a subscription filter has the following format:
$P=(A_{11}\sim_{11}v_{11}\wedge \ldots \wedge A_{1n_1}\sim_{1n_1}v_{1n_1}) \vee \ldots \vee (A_{k1}\sim_{k1}v_{k1}\wedge \ldots \wedge A_{kn_k}\sim_{kn_k}v_{kn_k})$ Depending on the embodiment of the metadata tables used to hold subscriptions further restrictions on the structure of filters might apply. For example, the embodiment discussed below assumes that in each conjunct $B_j=(A_{j1}\sim_{j1}v_{j1}\wedge \ldots \wedge A_{jn_j}\sim_{jn_j}v_{jn_j})$ an attribute appears at most once with a certain comparison operator, i.e.
$\forall 1\leq j\leq k \forall 1\leq x,y\leq n_j: A_{jx}=A_{jy}\wedge\sim_{jx}=\sim_{jy}\rightarrow v_{jx}=v_{jy}$ With reference to FIG. 4, when a table $T=\{A_1, \ldots, A_q\}$ is enabled for subscriptions a collection of metadata tables is set up which will hold all subscriptions on this table. It is obvious that various alternatives exist for these metadata tables and the basic inventional approach invention does not assume any particular structure. For clarification the following proceeding for deriving the necessary metadata tables will be suggested.

The ENABLE TABLE mechanism which could, for example, be provided as a database utility or a new SQL DDL element, accepts the name T of the table to be enabled as well as the list of comparison operators $\{\sim_1, \ldots \sim_m\}$ to be supported in subscriptions; if in addition to newly created tuples also updates or deletions of tuples should be treated as publications another parameter allows to specify this. Based on this input the ENABLE TABLE request will generate the collection of metadata tables as well as the aggregated subscription trigger. Next below, a sample syntax for the enable table request is given:
ENABLE TABLE table-name, [list-of-comparisons], [list-of-triggering-pubs]]

A sample embodiment of the processing taking place when the ENABLE TABLE request is performed will create for each comparison operator $\sim_i \in \{\sim_1, \ldots, \sim_m\}$ specified in the list of comparison operators a table $T\sim = \{Subscriber, A_1, \ldots, A_q, ANDID\}$. The table $T\sim$ used to hold tuples reflecting the various atomic expressions of a conjunct of the subscription filter will be described later with reference to FIG. 5.

The trigger that will be generated for this embodiment will be described in more detail with reference to FIG. 6.

Figure 4:
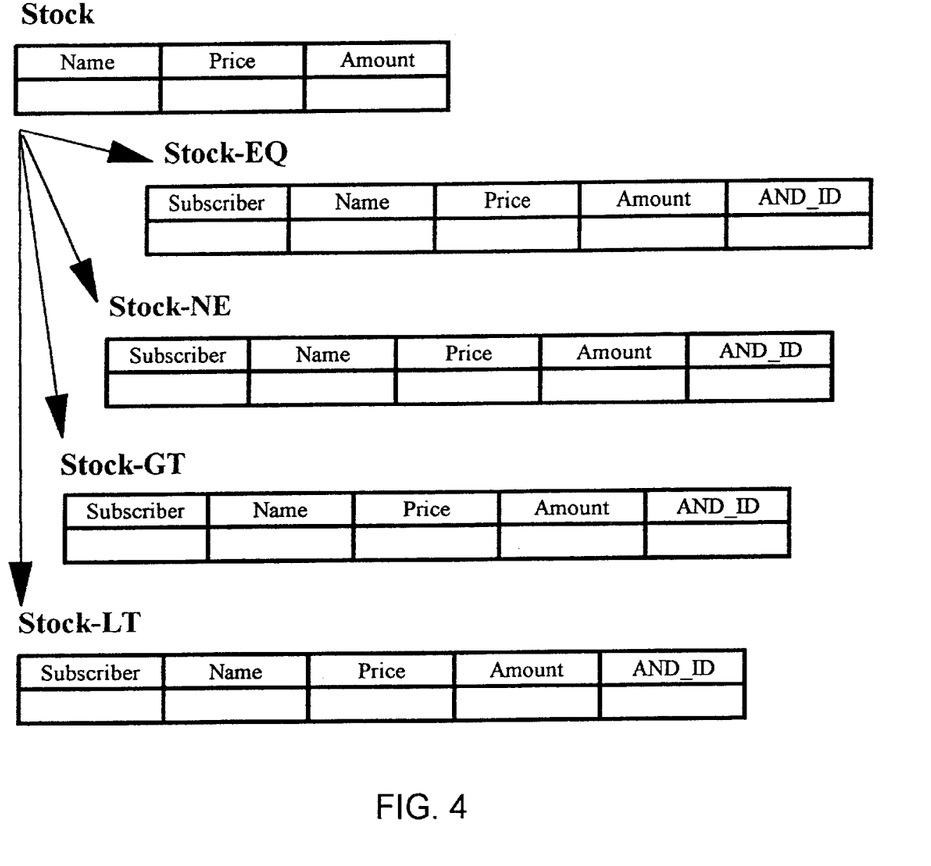
FIG. 4 is a schematic of sample meta tables according to the present invention.

With reference to FIG. 4 the insertion of tuples into the table Stock={Name, Price, Amount} will be enabled for subscriptions via the request ENABLE TABLE Stock, [EQ, NE, GT, LT], [INSERT], where EQ denotes "equal", NE denotes "not equal" etc. FIG. 4 depicts the metadata tables Stock-EQ, Stock-NE, Stock-GT, Stock-LT generated by this request.

Figure 5:
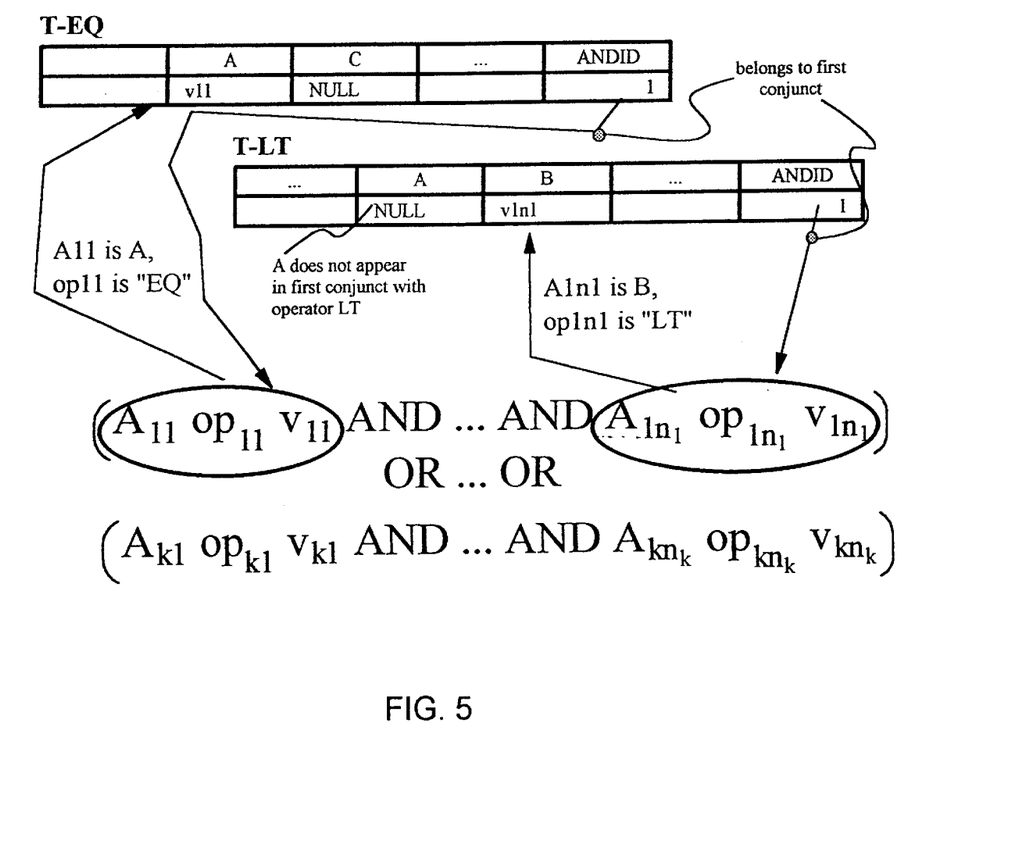
FIG. 5 is a schematic sketch illustrating the mapping of subscriptions to tuples in the metadata tables according to the present invention.

With reference to FIG. 5 subscriptions are described in more detail and how they can be mapped to the above mentioned tuples in the metadata tables.

Subscription filters for table $T=\{A_1, \ldots, A_q\}$ are reflected as follows as tuples in the metadata tables $T\sim_1, \ldots, T\sim_m$ of the sample embodiment from FIG. 4. Each conjunct $B_j=(A_{j1}\sim_1 v_{j1}\wedge \ldots \wedge A_{jn_j}\sim_{jn_j}v_{jn_j})$ of a filter $P=B_1\wedge \ldots \wedge B_k$ of a subscription request for subscriber S corresponds to exactly one tuple in each of the tables $T\sim_1, \ldots, T\sim_m$. The column ANDID of each of the tables $T\sim_1$ will hold the integer value j, and the column Subscriber will hold the value 'S' (i.e. a unique reference to the required information about the subscriber).

For each comparison operator $\sim_i$ all atomic expressions $A_{jp}\sim_{jp}v_{jp}$ appearing in conjunct $B_j$ will be determined where $\sim_{jp}=\sim_i$.

The corresponding column $A_{jp}$ of table $T\sim_i$ will be set to the value $v_{jp}$. For an attribute A that does not appear in an atomic expression with comparison operator $\sim_i$ in $B_j$ the value of A in the tuple within $T\sim_i$ corresponding to $B_j$ will be set to NULL.

It should be noted that if a conjunct $B_j$ of a subscription filter for subscriber S does not contain any atomic expression with comparison operator $\sim_i$, the table $T\sim_i$ will hold a tuple ('S', NULL, ..., NULL, j) to reflect this fact. Each subscription filter $P=B_1 \vee \ldots \vee B_k$ will thus result in exactly k tuples in each of the metadata tables $T\sim_1, \ldots, T\sim_m$.

Figure 6:
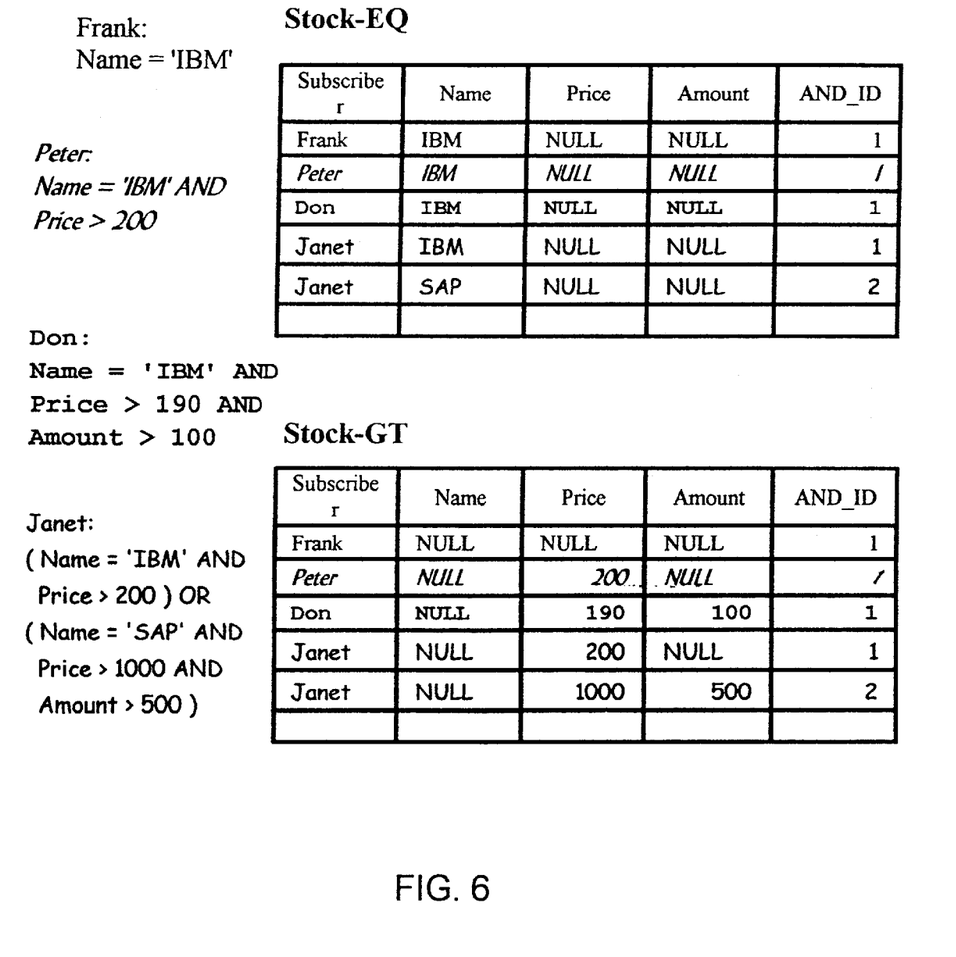
FIG. 6 is a schematic sketch of sample tables illustrating the mapping of subscriptions to tuples in the metadata tables the according to the present invention.

With reference to FIG. 6 a collection of sample subscription filters is depicted and how each of them is represented as tuples in the sample metadata tables of the sample embodiment from FIG. 4. Only the Stock-EQ and the Stock-GT metadata tables are shown exemplarily in this figure.

There are four exemplary subscribers Frank, Peter, Don and Janet. Subscriber Frank is interested in stock tuples with Name='IBM'. The subscription filter consists of a single conjunct, i.e. a single tuple in each of the metadata tables will map this filter. Because no expression within the filter involves the GT-operator (i.e. ">") the tuple ('Frank', NULL, NULL, NULL, 1) is inserted into Stock-GT. The only attribute from Stock appearing in the conjunct with comparison operator "=" is Name, i.e. the resulting tuple in Stock-EQ is ('Frank', 'IBM', NULL, NULL, 1).

Peter has been subscribed for stock information about IBM but just in case the stock price is greater than 200. Again, this filter consists of a single conjunct, i.e. a single tuple in each of the metadata tables will suffice to represent the filter. The only atomic expression involving the "=" comparison is "Name='IBM'", i.e. the corresponding tuple in Stock-EQ will be ('Peter', 'IBM', NULL, NULL, 1). One attribute of the filter is involved in a ">" comparison, namely the attribute "Price":Price>200. This results in the following tuple in Stock-GT:('Peter', NULL, NULL, 200, 1). Don has been subscribed for stock information about IBM but just in case the stock price is greater than 190 and the amount traded is greater than 100 shares. Again, this filter consists of a single conjunct, i.e. a single tuple in each of the metadata tables will suffice to represent the filter. The only atomic expression involving the "=" comparison is "Name='IBM'", i.e. the corresponding tuple in Stock-EQ will be ('Don', 'IBM', NULL, NULL, 1). Two attributes of the filter are involved in a ">" comparison, namely the attributes "Price" and "Amount":Price>190 as well as Amount>200. This results in the following tuple in Stock-GT:('Don', NULL, 190, 200, 1).

Janet's filter consists of two conjuncts, namely "Name='IBM' AND Price>200" as well as "Name='SAP' AND Price>1000 AND Amount>500". The first conjunct will result in the tuple ('Janet', 'IBM', NULL, NULL, 1) in the Stock-EQ table and the tuple ('Janet', NULL, 200, NULL, 1) in the Stock-GT table. The second conjunct will be reflected by inserting ('Janet', 'SAP', NULL, NULL, 2) and ('Janet', NULL, 1000, 500, 2) into the tables Stock-EQ and Stock-GT, respectively.

Figure 7:
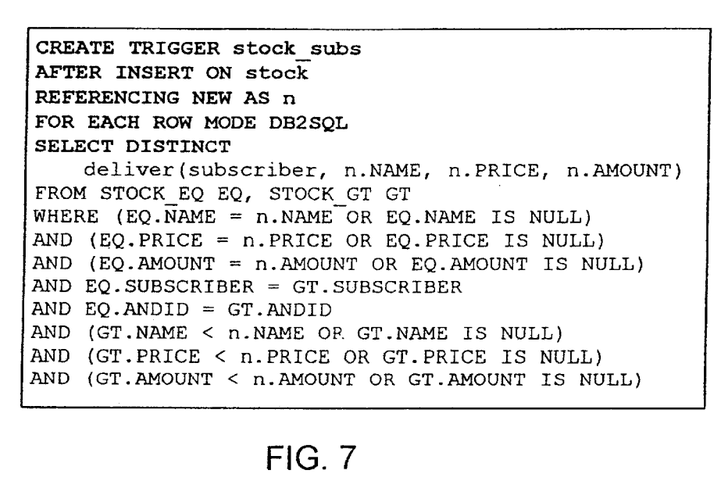
FIG. 7 is a schematic SQL code excerpt showing a preferred sample subscription trigger according to the present invention.

With reference to FIG. 7 the creation of subscription triggers will be described in more detail.

FIG. 7 shows the trigger which is generated by the ENABLE TABLE request in our Stock example based on our sample embodiment.

The trigger body, consists of a select statement which corresponds to the embodiment discussed for generating the metadata tables and for representing subscriptions in these metadata tables described with reference to FIGS. 4 and 5, respectively.

The processing of this statement per se by a relational database system is well known and irrelevant for the present invention. Thus, it requires no further explanation in here.

Figure 8:
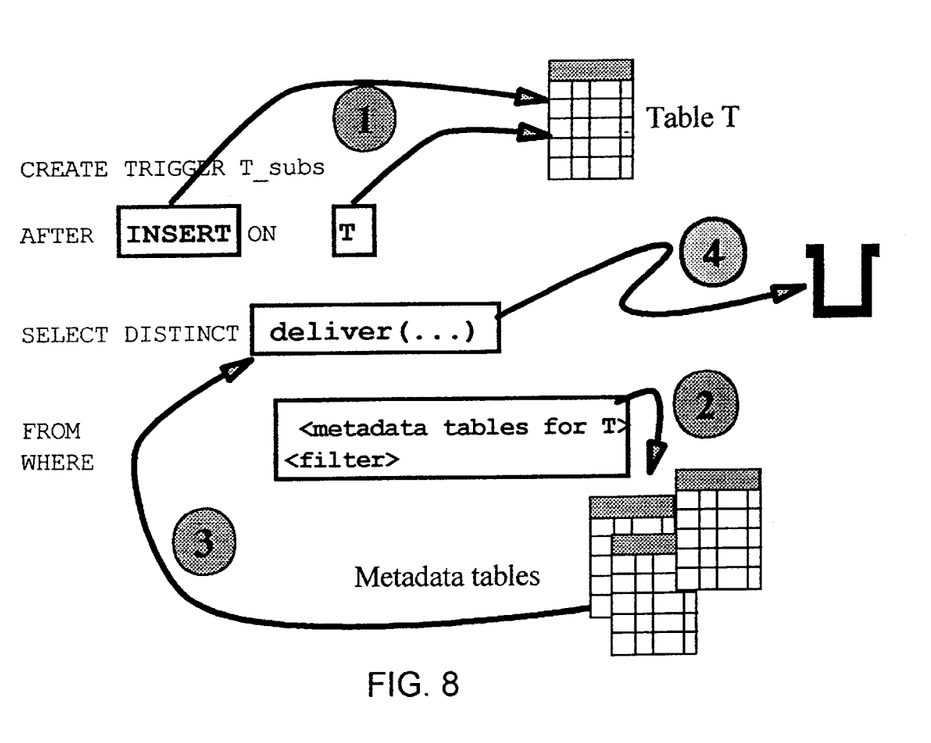
FIG. 8 is a schematic sketch illustrating the role of the delivery user-defined function UDF in the aggregated trigger according to the present invention.

With reference to FIG. 8 the second preferred aspect of the present invention is described in more detail, namely the use of user-defined functions, UDFs, for delivery of messages.

Independent from a specific embodiment of the metadata tables reflecting subscriptions on a table T, the aggregation trigger suggested by the present invention has the following structure which is depicted in FIG. 8.

For each type of modifications, i.e. insertion, deletion, update, of tuples from table T which should be treated as a publication, a separate trigger is created.

This trigger will be fired whenever a corresponding modification is performed on table T, see the items denoted as 1 in FIG. 8.

When the trigger is fired, the underlying database system will perform the body of the trigger, i.e. the select-statement in the case depicted in FIG. 7. The from- and where-clause of the select-statement will cause to filter all qualifying subscribers from the metadata tables, see item 2 in FIG. 8. It should be noted that the concrete from- and where-clause depends on the specific structure of the metadata tables.

For each of the qualifying subscribers the deliver-UDF specified in the select-clause is invoked—see item 3 in FIG. 8. Here, any of the column values from the computed join can be passed as parameter to the UDF, i.e. especially the subscriber identifier.

The deliver UDF will then process each subscriber according to his subscription request, depicted with item 4 in FIG. 8 which will often mean in praxis to enqueue the subscription response in a target user queue.

It is obvious that a plurality of embodiments of the deliver UDF exists. For example, one embodiment delivers newly created tuples as messages into subscriber specific target queues. For this purpose, the metadata tables may contain the target queue name for each subscriber. This queue name together with the complete new tuple is passed as parameter to the deliver-UDF. The UDF will compose a message out of the tuple and invoke the PUT request of the underlying messaging system (e.g. MQSeries) to destine the message to the subscriber's queue.

Another embodiment will deliver just the subscriber identifier and the identifier of the modified tuple into a system specific internal queue. Periodically, this queue can be processed by a separate program which will retrieve the modified tuples and submit them to the subscribers destination queue.

An interesting application of this approach is the periodic replication of modified data in data warehouse environments: Subscribers are the various copies of selective data in the environment and the subscription filters represent the data of interest for the local subset of operational data.

Another embodiment will insert a tuple, for example as an XML stream, into a table that is maintained for each subscriber. This would allow the subscriber to query this table to obtain the subscription results.

Through aspects of the present invention, an efficient way of using functionality externalized by database systems to implement publish/subscribe engines is presented.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, the delivery function can just put the minimum amount of information about the qualifying subscribers and the causing tuple, as e.g. its primary key into a separate queue. From this queue another program can construct the messages to be delivered to the qualified subscribers in a second step. This program can even compile a list of subscribers based on this queue input and pass the list to a stored procedure which will then more efficiently construct and actually deliver the messages to the subscribers.

It should be noted that a message broker typically deals with published, i.e. newly created messages. Thus, INSERT triggers suffice to capture this scenario. But notification engines built upon relational database technology as described in the present invention can easily deal with UPDATEd or DELETEd data e.g. messages, too: Instead of creating a subscription trigger that fires when a new tuple is INSERTed, the same subscription trigger can be created which fires on UPDATE or DELETE modifications on the table.

Further, the inventional concepts are applicable to any data holding system which need not necessarily be organized like an object-relational database. The term "database" should thus be understood in a very general sense.

What is claimed is:

1. A notification system for notifying one or more subscribers of changes to at least one database table T in a database system, the notification system comprising:

at least one metadata table associated with the database table T, the at least one metadata table for storing one or more representations of subscription requests on specified changes of database table T; and at least one subscription trigger implemented as at least one database trigger associated with the database table T and responsive to changes of the database table T, the at least one subscription trigger determining records of the database table T qualifying under the representation of subscription requests stored in the metadata table by criteria referring to the database table T and the at least one metadata table.

2. The notification system according to claim 1 wherein the criteria comprises a database query statement.

3. The notification system according to claim 2, in which the database query statement is independent from specific values of subscription requests and referring to specific values of the subscription requests only indirectly through the at least one metadata table content.

4. The notification system according to claim 1, further comprising notification means for delivery of the records determined by the at least one subscription trigger.

5. The notification system according to claim 4 in which the notification means being a user-defined function in the database system.

6. The notification system according to the claim 5 in which the subscriptions are stored in the metadata-table in disjunct normal form.

7. The notification system according to the claim 6 in which all subscriptions on a predetermined database table are aggregated into a single trigger.

8. The notification system according to the claim 7 in which the notifications are stored into a subscriber database.

9. A method for notifying one or more subscribers of changes to at least one database table T in a database system, the notifying method comprising the steps of:

(a) providing at least one metadata table associated with the database table T, the at least one metadata table for storing one or more representations of subscription requests on specified changes of database table T; and (b) providing at least one subscription trigger implemented as at least one database trigger associated with the database table T and responsive to changes of the database table T, the at least one subscription trigger determining records of the database table T qualifying under the representation of subscription requests stored in the metadata table by criteria referring to the database table T and the at least one metadata table.

10. The method according to claim 9 wherein the criteria comprises a database query statement.

11. The method according to claim 10, in which the database query statement is independent from specific values of subscription requests and referring to specific values of the subscription requests only indirectly through the at least one metadata table content.

12. The method according to claim 10, further comprising the step of (c) delivering the records determined by the at least one subscription trigger.

13. The method according to claim 12 in which the delivering step (c) notification means being a user-defined function in the database system.

14. The method according to the claim 13 in which the subscriptions are stored in the metadata-table in disjunct normal form.

15. The method according to the claim 14 in which all subscriptions on a predetermined database table are aggregated into a single trigger.

16. The method according to the claim 15 in which the notifications are stored into a subscriber database.

17. A computer readable medium program containing instructions for notifying one or more subscribers of changes to at least one database table T in a database system, the program instructions comprising the steps of:

(a) providing at least one metadata table associated with the database table T, the at least one metadata table for storing one or more representations of subscription requests on specified changes of database table T; and (b) providing at least one subscription trigger implemented as at least one database trigger associated with the database table T and responsive to changes of the database table T, the at least one subscription trigger determining records of the database table T qualifying under the representation of subscription requests stored in the metadata table by criteria referring to the database table T and the at least one metadata table.

18. The computer readable medium program according to claim 17 wherein the criteria comprises a database query statement.

19. The computer readable medium program according to claim 17, in which the database query statement is independent from specific values of subscription requests and referring to specific values of the subscription requests only indirectly through the at least one metadata table content.

20. The computer readable medium program according to claim 17, further comprising notification means for delivery of the records determined by the at least one subscription trigger.

21. The computer readable medium program according to claim 20 in which the notification means being a user-defined function in the database system.

22. The computer readable medium program according to the claim 21 in which the subscriptions are stored in the metadata-table in disjunct normal form.

23. The computer readable medium program according to the claim 22 in which all subscriptions on a predetermined database table are aggregated into a single trigger.

24. The computer readable medium program according to the claim 23 in which the notifications are stored into a subscriber database.

* * * * *